United States Patent
Sundararaman et al.

(10) Patent No.: US 9,621,471 B2
(45) Date of Patent: Apr. 11, 2017

(54) FRAMEWORK FOR EARLY CONGESTION NOTIFICATION AND RECOVERY IN A VIRTUALIZED ENVIRONMENT

(71) Applicant: VMware, Inc., Palo Alto, CA (US)

(72) Inventors: Santhosh Sundararaman, Sunnyvale, CA (US); Nithin B. Raju, Sunnyvale, CA (US); Akshay K. Sreeramoju, San Jose, CA (US); Ricardo Koller, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 143 days.

(21) Appl. No.: 14/320,416

(22) Filed: Jun. 30, 2014

(65) Prior Publication Data

US 2015/0381505 A1      Dec. 31, 2015

(51) Int. Cl.
*H04J 1/16*      (2006.01)
*H04L 12/825*   (2013.01)
*H04L 12/801*   (2013.01)

(52) U.S. Cl.
CPC .............. *H04L 47/25* (2013.01); *H04L 47/11* (2013.01); *H04L 47/12* (2013.01)

(58) Field of Classification Search
CPC ......... H04L 47/10; H04L 47/11; H04L 47/12; H04L 47/122; H04L 47/25
See application file for complete search history.

(56) References Cited

U.S. PATENT DOCUMENTS

| | | |
|---|---|---|
| 6,487,183 B1 | 11/2002 | Lo et al. |
| 7,706,266 B2 | 4/2010 | Plamondon |
| 2004/0267897 A1 | 12/2004 | Hill et al. |
| 2005/0050377 A1 | 3/2005 | Chan et al. |
| 2006/0028999 A1 | 2/2006 | Iakobashvili et al. |
| 2006/0104298 A1* | 5/2006 | McAlpine ............... H04L 47/10 370/412 |
| 2006/0282895 A1 | 12/2006 | Rentzis et al. |
| 2007/0055789 A1 | 3/2007 | Claise et al. |
| 2007/0081454 A1* | 4/2007 | Bergamasco ........... H04L 47/10 370/229 |
| 2008/0291927 A1 | 11/2008 | Yong et al. |
| 2010/0131636 A1 | 5/2010 | Suri et al. |
| 2012/0207018 A1 | 8/2012 | Goldenberg et al. |
| 2012/0287791 A1 | 11/2012 | Xi et al. |

(Continued)

FOREIGN PATENT DOCUMENTS

JP      2005-311863      11/2005

*Primary Examiner* — Kan Yuen

(57) ABSTRACT

The congestion notification system of some embodiments sends congestion notification messages from lower layer (e.g., closer to a network) components to higher layer (e.g., closer to a packet sender) components. When the higher layer components receive the congestion notification messages, the higher layer components reduce the sending rate of packets (in some cases the rate is reduced to zero) to allow the lower layer components to lower congestion (i.e., create more space in their queues by sending more data packets along the series of components). In some embodiments, the higher layer components resume full speed sending of packets after a threshold time elapses without further notification of congestion. In other embodiments, the higher layer components resume full speed sending of packets after receiving a message indicating reduced congestion in the lower layers.

20 Claims, 12 Drawing Sheets

(56) References Cited

U.S. PATENT DOCUMENTS

2013/0138830 A1   5/2013  Fang
2014/0233370 A1*  8/2014  Khare ................. H04L 41/0668
                                                              370/219

* cited by examiner

FRAMEWORK FOR EARLY CONGESTION NOTIFICATION AND RECOVERY IN A VIRTUALIZED ENVIRONMENT

BACKGROUND

Some current data centers and private enterprise networks run server virtualization software on compute nodes. These compute nodes generate large amounts of network traffic that includes traffic originating from the virtual machines, as well as infrastructure traffic. Infrastructure traffic is traffic that originates from the host machine layer rather than a particular virtual machine implemented on the host machine.

Currently some networks send traffic as individual packets of data. A data item larger than an individual packet is broken down into multiple packets, each packet is then sent over a network to a destination system (e.g., a computer or virtual machine). When the packets reach their destination, the data in the packets is reassembled to recreate the original data item. In current systems, a packet is not guaranteed to reach its destination. Therefore, for each packet successfully received, the destination system sends an acknowledgement message back to the source address of the packet. The acknowledgement message alerts the original sender that that packet has been received. When a source system sends a packet that is lost in transmission (e.g., the packet is sent to a malfunctioning or busy intermediate system), the destination system does not send an acknowledgement message for that packet. The sending system is set up under the assumption that an unacknowledged packet was lost in transmission. Accordingly, when a threshold amount of time passes after a packet is sent, without the sending system receiving an acknowledgement message, the sending system re-sends the packet. In some network systems the threshold time is based on the round trip time between the sending and receiving systems. That is, in some cases the allowable threshold is the time for the packet to travel from the source system to the destination system, plus the time for the acknowledgement message to be generated and travel back to the source system, plus some buffer time to account for reasonable delays.

When a source system and destination system are geographically distant, the round trip time could be hundreds or thousands of milliseconds. The round trip time is great enough that it would be very inefficient to send one packet, and then wait for acknowledgement of that packet before sending the next packet. Accordingly, many packets are sent while waiting for the acknowledgement message for the first packet to arrive. The sending of many packets while waiting for an acknowledgement message to arrive causes problems when part of the transmission path between the systems is congested. Various networking links between systems have a limited memory capacity and serve as part of the path for multiple source and destination systems. When the memory capacity of an intermediary system is full or too close to full, the intermediate system will start to drop packets or refuse new packets, in some cases causing other intermediate systems to drop packets. In some cases an intermediary system refusing packets causes a great enough delay that a source system re-sends the packets. The re-sent packets can further increase congestion, making the original problem worse.

In some networking systems, when a threshold number of acknowledgement messages are missed within a particular amount of time, the source system determines that there is congestion on the path the packets are taking. The source system then slows down the rate of packet transmission in order to allow the congestion to clear. However, when the round trip time (for packet and acknowledgement message) is long, many packets can be sent out before the source system recognizes that congestion is an issue. This causes inefficient retransmission of packets that will be stopped by congestion and/or make the congestion worse. The inefficiency is particularly great when the point of congestion is within the same host machine as the source system (e.g., the congestion is at one or more layers of a set of network transmission layers on a kernel of the host machine) and the destination machine is far away. That is, the traffic congestion is at the beginning of the transmission path, but the round trip time is long and therefore the threshold for determining that packets are being lost is correspondingly long. In such cases, it takes a long time to identify that there is congestion, and many packets are sent at a high rate during that time.

BRIEF SUMMARY

Some embodiments provide a congestion notification system for a computer virtualization networking stack. The computer virtualization networking stack of some embodiments is a series of software and/or hardware processes and/or components that pass data in packets along the series of processes, ultimately to a network. Although the term "component" is used herein, one of ordinary skill in the art will understand that in some embodiments processes are used instead of components. In some embodiments, some or all of the components include queues for storing data packets until the data packet can be sent to the next component in the series. These queues have finite capacity for data packets. When a queue of a component is full, any additional data packets arriving at that component will be dropped. The packet sender will then have to resend the packets in order for the data in them to be received by the destination computer, machine, or virtual machine.

The congestion notification system of some embodiments sends messages from lower layer (e.g., closer to the network in the series of components) components to higher layer (e.g., closer to the packet sender) components. When the higher layer components receive the congestion notification messages, the higher layer components reduce the sending rate of packets (in some cases the rate is reduced to zero) to allow the lower layer components to lower congestion (i.e., create more space in their queues by sending more data packets along the series of components). In some embodiments, the higher layer components resume full speed sending of packets after a threshold time elapses without further notification of congestion. In other embodiments, the higher layer components resume full speed sending of packets after receiving a message indicating reduced congestion in the lower layers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide early notification of congestion to a packet sender in order to allow the packet sender to reduce the rate at which it sends packets. By reducing the rate of sending packets earlier than would be possible in prior art systems, the present invention reduces wasted time and further congestion delays caused by additional packets and re-sent packets from the packet sender.

Figure 1:
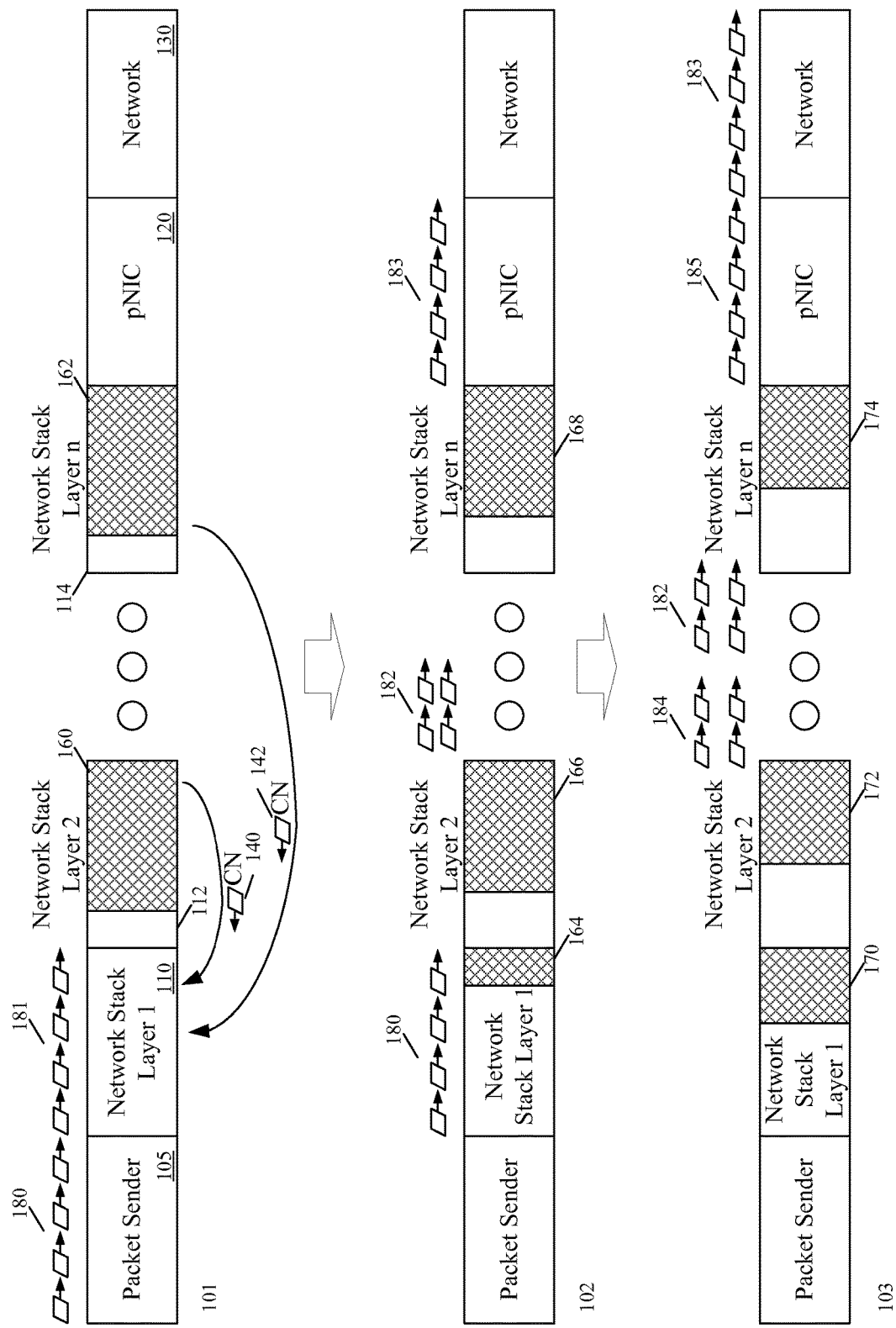
FIG. 1 conceptually illustrates a system of congestion notification in a multiple transmission layer host sending data to a network.

The congestion notification system of some embodiments sends congestion notification messages from lower layers of a computer virtualization network stack to higher layers of the stack. In response to the congestion messages, the higher layer components reduce the rate of sending packets to allow the congestion to clear. FIG. 1 conceptually illustrates a system of congestion notification in a multiple transmission layer host sending data to a network. The figure includes three stages 101-103, a packet sender 105, network stack layers 110, 112, and 114, a physical network interface card (pNIC) 120, a network 130, congestion notification (CN) messages 140 and 142, congestion indicators 160-174, and data packets 180-183.

The packet sender 105 is a source of data to be sent over the network 130. The network stack layers 110-114 represent different processes on a host machine that each receive packets from the packet sender 105 or a previous network stack layer, process the packets, and send the packets to the next network stack layer or the pNIC 120. As indicated by the ellipsis between layers 112 and 114, in some embodiments, additional network stack layers are provided. In the illustrated embodiment, some network stack layers include queues to store packets before passing the packets on to the following network stack layer. If a new packet comes in to a particular network stack layer while the queue of that network stack layer is full, the network stack layer drops the packet.

The congestion notification system is implemented by some embodiments in order to reduce the number of additional packets sent by the higher layers (layers farther from the network) to the lower layers (layers closer to the network) while the queues of the lower layers are full (or nearly full). In stage 101, the queues of network stack layers 112 and 114 are nearly full, as indicated by congestion indicators 160 and 162, respectively. The congestion indicators 160 and 162 occupy a portion of their network stack layers proportional to the percentage of the queues are full. Even though the queues are not entirely full, if the network stack layers 112 and 114 receive too many more packets before the congestion of the queues can be reduced (e.g., by sending packets to the lower layers or the pNIC 120) will cause the queues to fill completely. When the queues fill completely, network stack layers 112 and 114 will start dropping packets.

To alert the process that manages network stack layer 110 to the status of the queues as fuller than a threshold percentage, in stage 101, the processes that manage network stack layers 112 and 114 send CN messages 140 and 142, respectively, to the process that manages network stack 110. The CN messages 140 and 142 indicate a need to reduce the rate of sending packets. Accordingly, in response to the CN messages 140 and 142, the network stack layer 110 reduces the rate of sending packets (in some embodiments the rate is reduced to zero in some circumstances). Also in stage 101, packets 180 are about to be sent from packet sender 105 and packets 181 are arriving at network stack layer 110.

In stage 102, the network stack layer 110 stores packets 181 in its queue as indicated by congestion indicator 164. Because of the CN messages 140 and 142, the process managing network stack layer 110 does not send any packets to network stack layer 112. Meanwhile, the processes managing network stack layers 112 and 114 send out packets 182 and 183 from their respective queues. Sending out packets 182 and 183 reduces the congestion in network stack layer 112 and 114, as indicated by congestion indicators 166 and 168, which are smaller in this stage than indicators 160 and 162, respectively, in stage 101. In stage 103, network stack layer 110 stores packets 180, making the queue of network stack layer 110 fuller, as indicated by congestion indicator 170. Network stack layers 112 and 114 send out packets 184 and 185 respectively, further reducing their queues (as indicated by congestion indicators 172 and 174, respectively), while packets 182 and 183 continue to be passed toward the network 130.

I. Network System

The congestion notification system of some embodiments is implemented to solve problems caused by sending data over long distances on a conventional IP network. When sending data over a long distance, there is a long delay between a point on the network becoming congested, and a sender of data packets determining that there is congestion on the network. During this long delay, the data packet sender sends out many more packets, worsening the congestion. In systems without congestion notification, the long delay occurs even when the congestion in the network is within the same host machine as the data packet sender.

Figure 2:
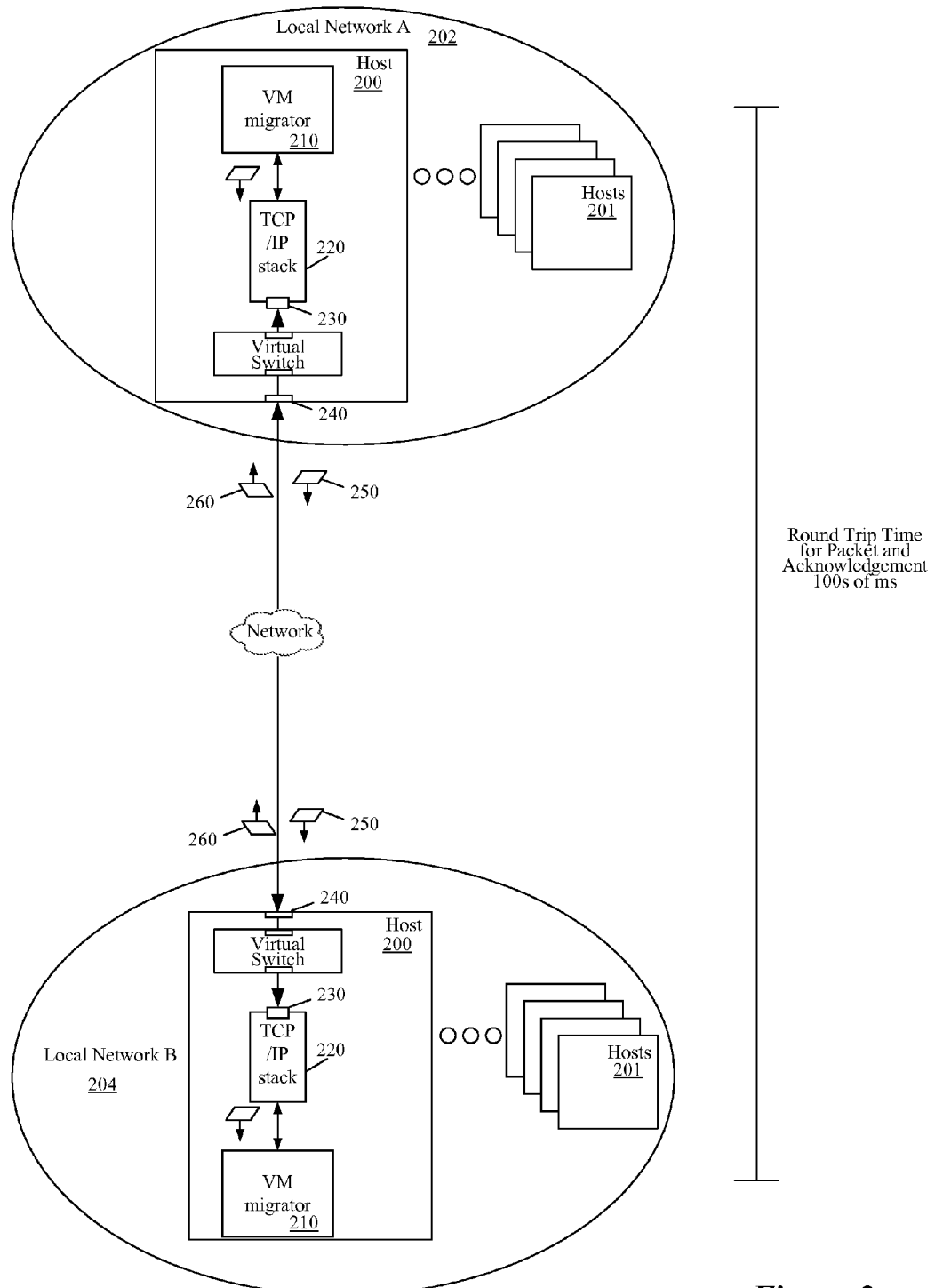
FIG. 2 illustrates a networked system in which the congestion notification system of some embodiments operates.

FIG. 2 illustrates a networked system in which the congestion notification system of some embodiments operates. The system includes hosts 200 and 201, local networks 202 and 204, virtual machine (VM) migrators 210, TCP/IP stacks 220, virtual switches 230, pNICs 240, packets 250, and acknowledgement messages 260.

The hosts 200 and 201 implement virtual machines (not shown). For various reasons, it is sometimes advantageous to move virtual machines from one host to another host. VM migrators 210 transfer virtual machines between one host and another. The virtual machines are transferred as multiple packets 250 sent over a network. When the host machines are distant from each other, the round trip time (for a packet 250 and an acknowledgement message) can be hundreds of milliseconds. Because of the long round trip time, the expected time between sending a packet and receiving an acknowledgement message is correspondingly long. Therefore, the amount of time it takes to determine, from the absence of acknowledgement messages, that the connection is congested is also correspondingly long. In that time, many additional packets can be sent out, causing further congestion and being blocked. Furthermore, in some network systems, the higher the delay between the sender and the receiver, the higher the number of packets that the sender has to send without receiving acknowledgements in order for the sender (and/or other network components) to determine that the connection is congested.

Some embodiments provide a congestion notification system that works within a particular host 200 to allow network stack layers to identify and respond to local congestion quickly, resulting in less packet loss and less overall congestion. For example, in some embodiments, if there is congestion on a host 200 between a virtual switch 230 and a pNIC 240, the congestion notification system alerts the VM migrator 210, the TCP/IP stack 220, or some other packet generating or transmitting element about the congestion. The element that receives the notification then reduces the transmission rate of the packets (e.g., by storing packets in its own buffer, in the case of packet transmitters or not generating packets in the case of packet generators). The reduced transmission rate of packets allows the lower layer to deal with the congestion before receiving too many additional packets.

II. Host Machine

Figure 3:
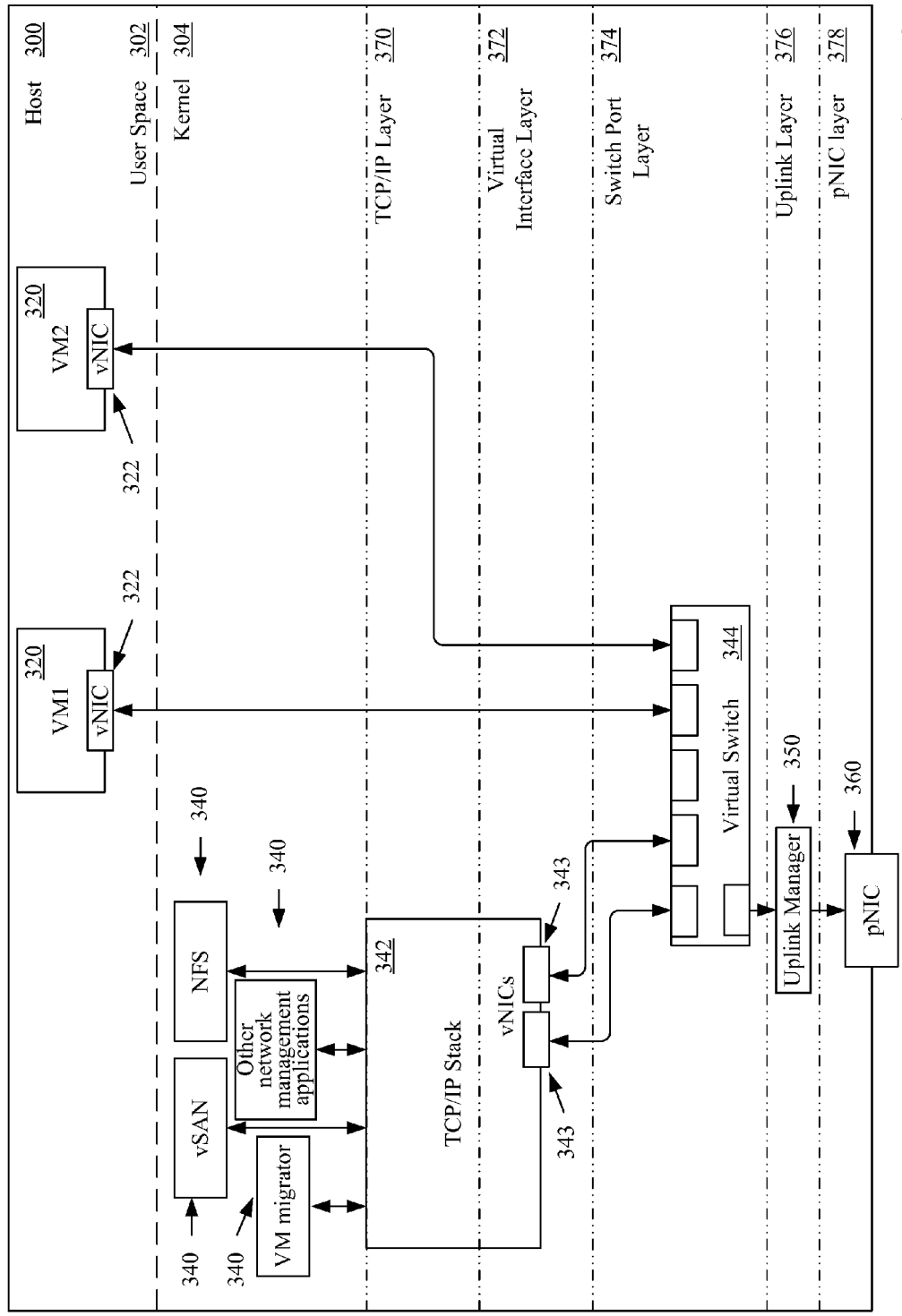
FIG. 3 illustrates a host computer with multiple network stack layers.

The congestion notification system of some embodiments is implemented on host machines of a data center or private enterprise networking system. FIG. 3 illustrates a host computer with multiple network stack layers. The figure shows a system in which the congestion notification system of some embodiments is implemented. The figure includes a host machine 300 that implements a user space 302 and a kernel 304. In the user space 302, the host 300 implements virtual machines 320 with virtual network interface cards (vNICs) 322. In the kernel 304, the host 300 implements multiple network processes 340, TCP/IP stack 342 with vNICs 343, virtual switch 344, and uplink manager 350. The host machine 300 includes a physical network interface card (pNIC) 360. The kernel 304 is conceptually divided into multiple layers 370-378 representing different processes or sets of processes that implement network stack layers.

Host machine 300 could be a host machine on a multitenant datacenter or a host machine on a single tenant enterprise network. The user space 302 and kernel 304 are divisions of the computing capabilities of the host machine 300 and may be implemented using different sets of application programming interfaces (APIs). Accordingly, processes running in the user space 302 may have different restrictions on them, and/or have access to different resources, than processes running in the kernel 304. The virtual machines 320 simulate separate computers. The virtual machines 320 can be virtual machines controlled by a single entity (e.g., a single tenant) or can be controlled by multiple entities (e.g., multiple tenants). The virtual network interface cards (vNICs) 322 are software constructs that the virtual machines 320 use to connect to a virtual switch 344 in the kernel 304 of the host 300.

TCP/IP stack 342 is a software construct that manipulates data received from various network processes 340, converting the data into IP packets that can be sent through the vNICs 343 to virtual switch 344, through the virtual and then out to a network (e.g., a public datacenter, an enterprise network, the Internet, etc.). Virtual switch 344 is a software construct that receives IP packets from within the host 300 and routes them toward their destinations (inside or outside the host 300). The virtual switch 344 also receives packets from outside the host 300 and routes them to their destinations in the host 300. The uplink manager 350 processes packets going from the virtual switch 344 to the pNIC 360. The uplink manager 350 stores the packets in an uplink queue until the pNIC 360 is available to send the packets out. The pNIC 360 is a hardware element that receives packets from within the host 300 that have destinations outside the host and forwards those packets toward their destinations over a network. The pNIC 360 also receives packets from outside the host (e.g., from a local network or an external network such as the Internet) and forwards those packets to the virtual switch 344 for distribution within the host 300.

The TCP/IP stack 342 is a stack of protocols that together translate data from the various processes 340 into IP packets that can be sent out on an IP network (e.g., the Internet). The TCP/IP stack 342 does not send the packets directly to their destinations. Instead, the TCP/IP stack sends the IP packets through the vNICs 343. The vNICs 343 store the packets in a virtual adapter dispatch queue until the virtual switch is ready to send the packets further. The virtual switch 344 is a "next hop" in the direction of the ultimate destination of the IP packets. The virtual switch 344 examines each IP packet individually to determine whether the destination of the packet is to a process running on the host 300 or to a process or machine outside of the host 300. When an IP packet is addressed to a destination on the host 300, the virtual switch 344 sends the IP packet to the destination process on the host 300. When an IP packet is addressed to a destination not on the host 300, the virtual switch forwards the IP packet to the uplink manager 350 to be queued for pNIC 360. The pNIC 360 sends the IP packet to a network (not shown) for further forwarding to its destination.

The kernel 304 is shown as conceptually divided into multiple layers 370-378. The layers 370-378 are not physical layers on the host 300, but are shown to represent the order in which data passes from network processes 340 to the pNIC 360. Layer 370 is a TCP/IP layer, including the TCP/IP stack that converts data from network processes 340 into TCP/IP packets. In some embodiments, the TCP/IP stack 342 includes a TCP buffer for storing packets. Layer 372 is a virtual interface layer, including the vNICs 343 which provide a virtual adapter dispatch queue. Switch port layer 374 includes virtual switch 344. In some embodiments, virtual switch 344 passes packets from the vNICs to the uplink manager 350, but does not include a packet queue. In other embodiments, the virtual switch 344 does include a packet queue. Uplink layer 376 includes uplink manager 350. Uplink manager 360 in some embodiments includes an uplink queue. The pNIC layer 378 includes pNIC 360. In some embodiments, the pNIC 360 does not include a packet queue. In other embodiments, the pNIC 360 does include a packet queue.

In some embodiments, any layer that includes a queue can be a potential choke point where packets can be dropped when the queue is full. Accordingly, in some embodiments, processes included in any or all layers with a queue provide congestion notification messages. Although the layers are shown with a single component each in the network stack, in some embodiments a particular layer could include multiple components. For example, in some embodiments the switch packet layer, between the vNIC and the virtual switch could include multiple components such as firewalls, virus scanners, queue shaping applications, and/or any other applications associated with the networking software or by third parties, etc. Any or all of these components could include queues that can become congested. Such queues create multiple chokepoints between the vNIC and the virtual switch. Therefore, these components, in some embodiments, send congestion notification messages. Furthermore, in some embodiments, any or all of the additional components mentioned above are implemented between any other two identified layers (e.g., between the virtual switch and the uplink manager), instead of, or in addition to being implemented between the vNIC and the virtual switch.

III. Computer Virtualization Networking Stacks

Figure 4:
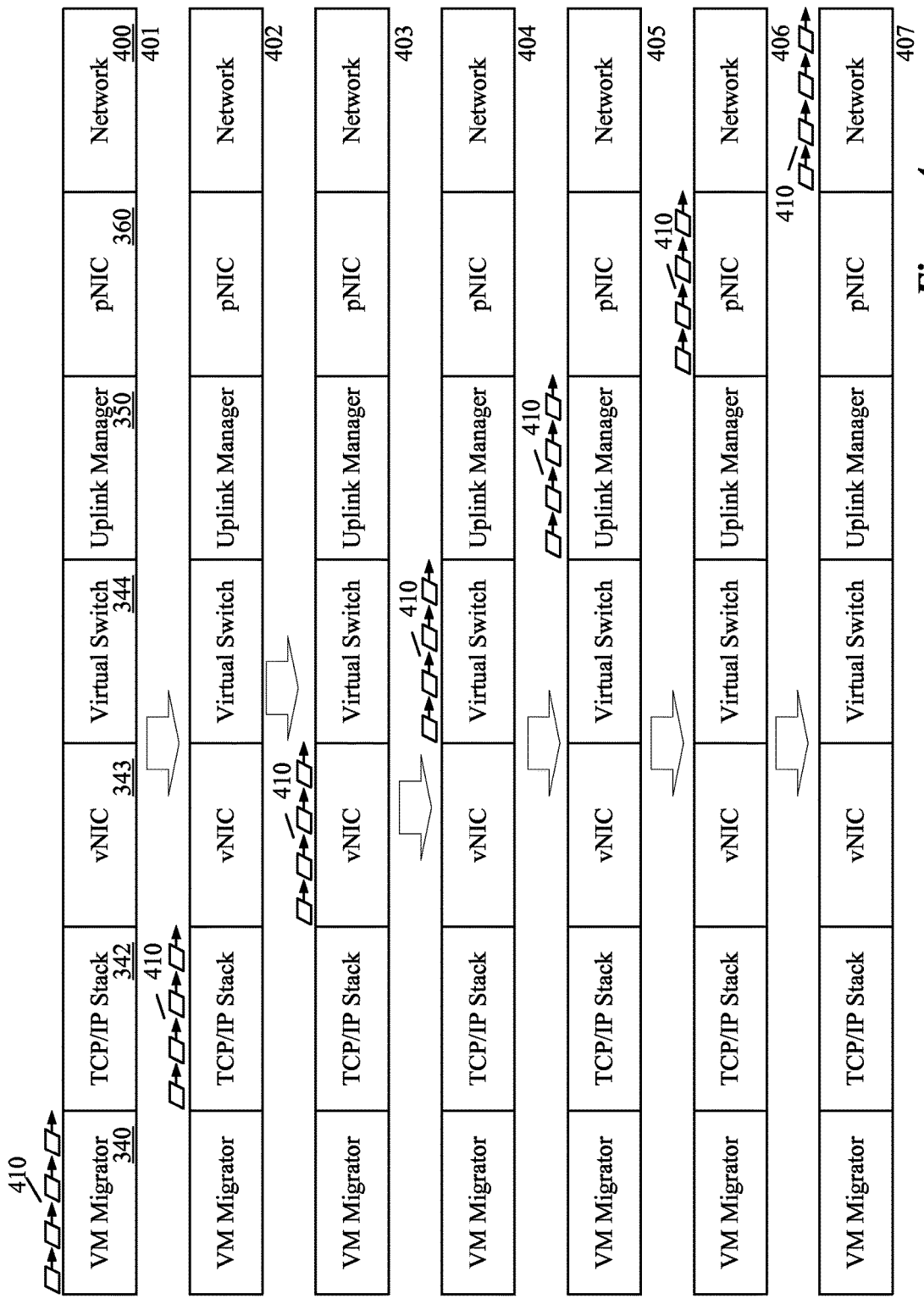
FIG. 4 illustrates a set of packets passing through a computer virtualization networking stack of some embodiments.

The congestion notification system of some embodiments is implemented to allow congestion notification between multiple components in a series of components in a computer virtualization networking stack. In some embodiments some or all of the components of the computer virtualization networking stack are controlled by separate entities (e.g., separate computer processes, components, and/or hardware on a host). FIG. 4 illustrates a set of packets passing through a computer virtualization networking stack of some embodiments. In addition to various packet sending and transmitting elements from FIG. 3, FIG. 4 includes network 400 and packets 410 in stages 401-407. The figure shows the ideal progression of packets 410 under ideal conditions (with no congestion) from a data sending process (here, the VM migrator 340) to a network 400. In FIG. 4, the bandwidth of each component 340, 342, 343, 344, 350, and 360, and network 400 is represented by the height of the component. Under ideal conditions, each component has the same bandwidth so none of the components becomes a bottleneck when packets are being sent. Because FIG. 4 illustrates a computer virtualization networking stack under ideal conditions, each component has the same bandwidth in this figure. However, in subsequent figures, with less ideal conditions, the bandwidths of the components, and the illustrated heights of the components in those figures, vary.

The packets start from the VM migrator 340 in stage 401. In some embodiments, the VM migrator generates the packets, in other embodiments, the VM migrator provides raw data to another process which divides the raw data into packets. The packets 410 are then transmitted to TCP/IP stack 342 in stage 402. The TCP/IP stack translates the data into TCP/IP packets. The packets 410 are then transmitted to vNIC 343 in stage 403. The packets 410 are then transmitted to virtual switch 344 in stage 404. The packets 410 are then transmitted to uplink manager 350 in stage 405. The packets 410 are transmitted to pNIC 360 in stage 406, and then sent out onto network 400 in stage 407.

FIG. 4 includes various specific components in a computer virtualization networking stack. However, one of ordinary skill in the art will understand that other embodiments may contain more, fewer, or different components. For example, some embodiments provide additional components (e.g., firewalls, virus scanners, queue managers, QOS filters, etc.) in the computer virtualization networking stack. For example, some embodiments, provide such additional components between a vNIC and a virtual switch.

Figure 5:
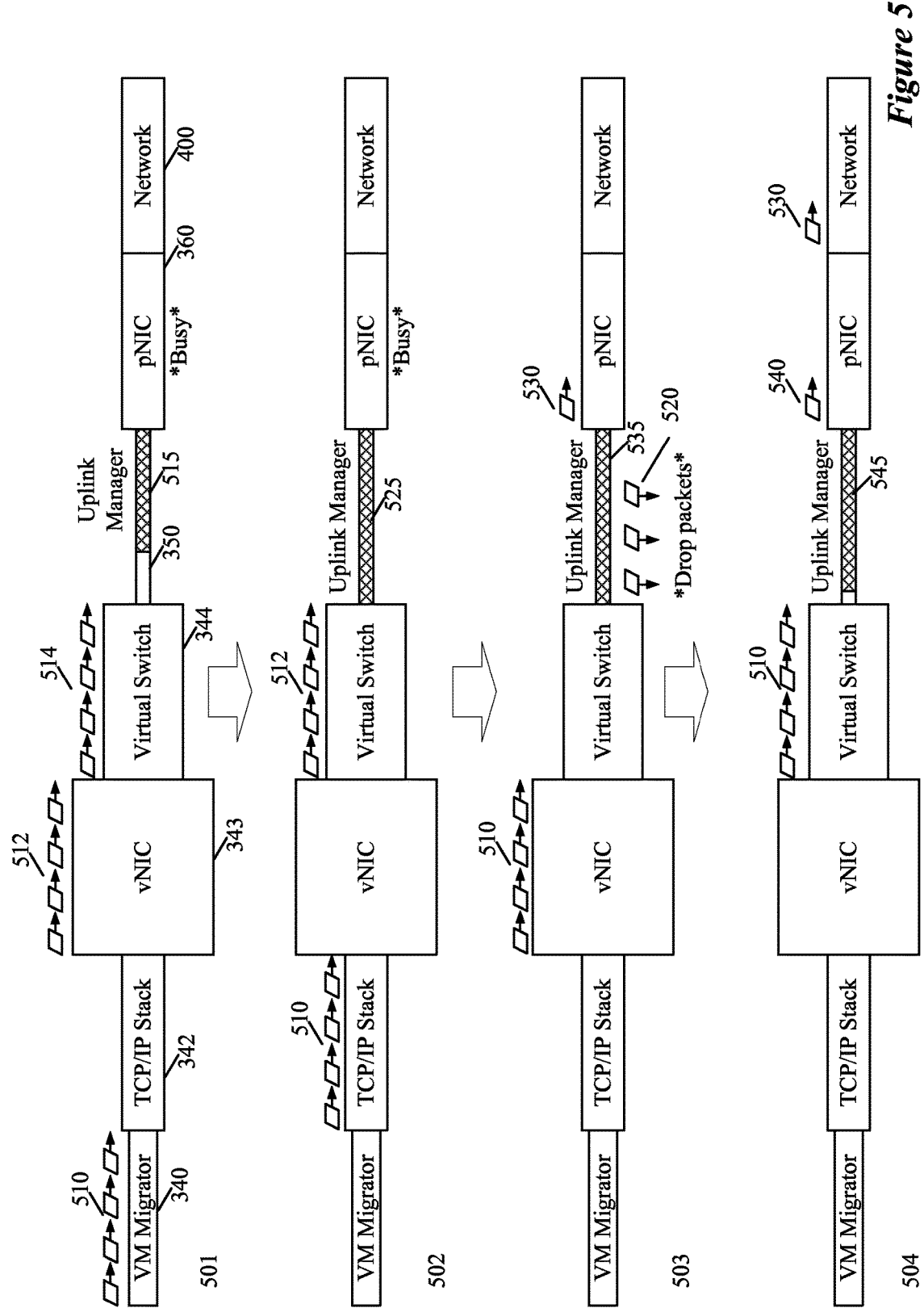
FIG. 5 illustrates the passage of a set of packets through a computer virtualization networking stack under less than ideal conditions, without a congestion notification system.

FIG. 5 illustrates the passage of a set of packets through a computer virtualization networking stack under less than ideal conditions, without a congestion notification system. The computer virtualization networking stack is shown in stages 501-504. The figure shows sets of packets 510, 512, and 514, dropped packets 520, and individual packets 530 and 540. The figure also shows congestion indicators 515, 525, 535, and 545. The computer virtualization networking stack of FIG. 5 has different bandwidths for different components. The bandwidth of each component is indicated by the height of the component (e.g., vNIC 343 has much more bandwidth than uplink manager 350).

In stage 501, packets 510 are being sent from VM migrator 340 to TCP/IP stack 342. Packets 512 are being sent from vNIC 343 to virtual switch 344. Packets 514 are being sent from virtual switch 344 to uplink manager 350. The uplink manager 350 already has packets in its uplink queue (as indicated by congestion indicator 515), but in this stage pNIC 360 is busy, so no packets can be sent from the uplink queue to the pNIC 360 by the uplink manager 350. In stage 501, the uplink queue of the uplink manager 350 is almost full, as indicated by congestion indicator 515. In this figure, congestion indicators occupy a portion of their corresponding component (in a given stage) that is proportional to how full the queue is during that stage.

In stage 502, packets 514 arrive at uplink manager 350. The packets 514 finish filling up the uplink queue of the uplink manager 350 (as indicated by congestion indicator 525, which covers the entire uplink manager 350). Meanwhile, packets 510 arrive at TCP/IP stack 342, ready to be sent to vNIC 343, Packets 512 arrive at the virtual switch 344, ready to be sent to uplink manager 350 (with its full uplink queue).

In stage 503, pNIC 360 is no longer busy, so uplink manager 350 sends an individual packet 530 from the uplink queue to pNIC 360. In the illustrated example, the uplink manager has only enough bandwidth to send one packet per stage to the pNIC 360. In the same stage 503, the packets 512 arrive at the uplink manager 350. Since only one packet 530 has left the uplink queue of the uplink manager 350, there is only enough room in the uplink queue for one of the 4 packets 512. Accordingly, one of the packets is stored in the uplink queue (leaving the uplink queue full again) and the uplink manager 350 drops the other three packets, represented as dropped packets 520. Additionally, packets 510 are transferred to vNIC 343, ready for transfer to virtual switch 344.

In stage 504, pNIC 360 is also not busy, so uplink manager 350 sends an individual packet 540 from the uplink queue to pNIC 360. Similarly, pNIC 360 sends individual packet 530 out to the network. As mentioned above, in the illustrated example, the uplink manager has only enough bandwidth to send one packet per stage to the pNIC 360. In the same stage 504, no packets arrive at the uplink manager 350, leaving the uplink queue with one packet's worth of space (as indicated by congestion indicator 545, which covers most of uplink manager 350). Additionally, packets 510 are transferred from vNIC 343 to virtual switch 344. In the next stage (not shown) the packets 510 will reach the uplink manager, overflowing the uplink queue again and forcing the uplink manager to again drop packets. With no congestion notification system in place, packets will be dropped from two groups of packets.

Figure 6:
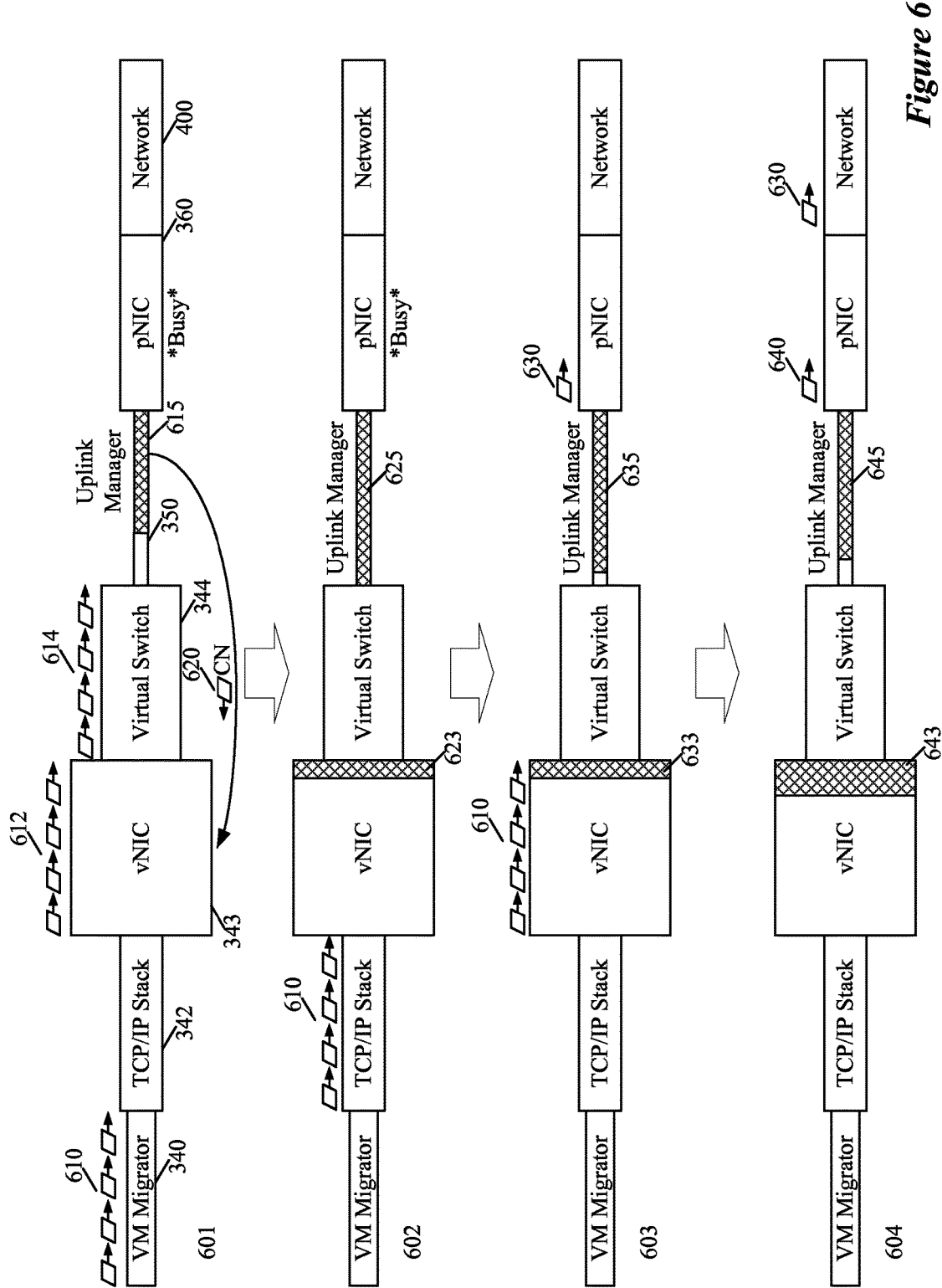
FIG. 6 illustrates the passage of a set of packets through a computer virtualization networking stack under less ideal conditions, with a congestion notification system.

FIG. 6 illustrates the passage of a set of packets through a computer virtualization networking stack under less ideal conditions, with a congestion notification system. The computer virtualization networking stack is shown in stages 601-604. The figure shows sets of packets 610, 612, and 614, congestion notification message 620, and individual packets 630 and 640. The figure also shows congestion indicators 615, 623, 625, 635, 643, and 645. The computer virtualization networking stack of FIG. 6 has different bandwidths for different components. The bandwidth of each component is indicated by the height of the component (e.g., vNIC 343 has much more bandwidth than uplink manager 350) and are the same as the bandwidths of the corresponding components in FIG. 5.

In stage 601, packets 610 are being sent from VM migrator 340 to TCP/IP stack 342. Packets 612 are about to be sent from vNIC 343 to virtual switch 344. Packets 614 are being sent from virtual switch 344 to uplink manager 350. The uplink manager 350 already has packets in its uplink queue (as indicated by congestion indicator 615), but in this stage pNIC 360 is busy, so no packets can be sent from the uplink queue to the pNIC 360 by the uplink manager 350. In stage 601, the uplink queue of the uplink manager 350 is almost full, as indicated by congestion indicator 615. In this figure, congestion indicators occupy a portion of their corresponding component (in a given stage) that is proportional to how full the queue is during that stage.

In contrast to the computer virtualization networking stack of FIG. 5, the computer virtualization networking stack of FIG. 6 implements a congestion notification system. As the uplink queue of uplink manager 350 is more than a threshold amount full, the uplink manager 350 sends a congestion notification message 620 to the vNIC 343. This message alerts the vNIC 343 to the congested status of the uplink queue. Although the uplink queue is not completely full when the congestion notification message 620 is sent, the message is sent in stage 601 because packets that are already past vNIC 343 (e.g., packets 614) could use up the rest of the space in the uplink queue of uplink manager 350.

In stage 602, the packets 614 arrive at uplink manager 350. The packets 614 finish filling up the uplink queue of the uplink manager 350 (as indicated by congestion indicator 625, which covers the entire uplink manager 350). Meanwhile, packets 610 arrive at TCP/IP stack 342, ready to be sent to vNIC 343. The vNIC 343, in response to the congestion notification message 620 has stored packets 612, rather than sending the packets to virtual switch 344 (as happened to packets 512 in FIG. 5). The storage of these packets in the vNIC queue of vNIC 344 is shown by congestion indicator 623. The results of storing these packets, rather than sending them to the virtual switch 344 are shown in stage 603. While the embodiment of FIG. 6 stores all the packets of packets 612, in some embodiments, some fraction of the packets (e.g., based on the bandwidth of the uplink manager 350) are sent while the rest are queued. For example, in some embodiments, the vNIC 343 would send as many packets per stage as the uplink manager 350 can send to the pNIC 360 (here, one packet per stage), when the pNIC is not busy.

In stage 603, pNIC 360 is no longer busy, so uplink manager 350 sends an individual packet 630 from the uplink queue to pNIC 360. In the illustrated example, the uplink manager has only enough bandwidth to send one packet per stage to the pNIC 360. In the same stage 603, the packets 612, having been stored in the vNIC queue of vNIC 343 (in stage 602), do not arrive at the uplink manager 350. As the packets 612 have not reached the uplink manager, the packets 612 do not overflow the uplink queue of the uplink manager 350 (as was the case with packets 512 in stage 503 of FIG. 5). Accordingly, no packets are dropped. Furthermore, the uplink queue is left with space for a packet, as indicated by congestion indicator 635, which covers most, but not all, of uplink manager 350.

Additionally, packets 610 are transferred to vNIC 343, ready for transfer to virtual switch 344. However, because of the previously received congestion notification message 620, the vNIC 343 will store the packets 610 in the vNIC queue rather than sending them to virtual switch 344 in stage 604. In stage 604, pNIC 360 is also not busy, so uplink manager 350 sends an individual packet 640 from the uplink queue to pNIC 360. Similarly, pNIC 360 sends individual packet 630 out to the network. As mentioned above, in the illustrated example, the uplink manager has only enough bandwidth to send one packet per stage to the pNIC 360. In the same stage 604, no packets arrive at the uplink manager 350, leaving the uplink queue with two packet's worth of space (as indicated by congestion indicator 645, which covers most of uplink manager 350). As mentioned above, packets 610 are not transferred from vNIC 343 to virtual switch 344. Therefore, in the next stage (not shown) no packets will reach the uplink manager. The uplink queue will not overflow and the uplink manager 350 will not have to drop any packets. With the congestion notification system in place, no packets are dropped from packets 610 and 612.

IV. Congestion Notification System Messages

Figure 7:
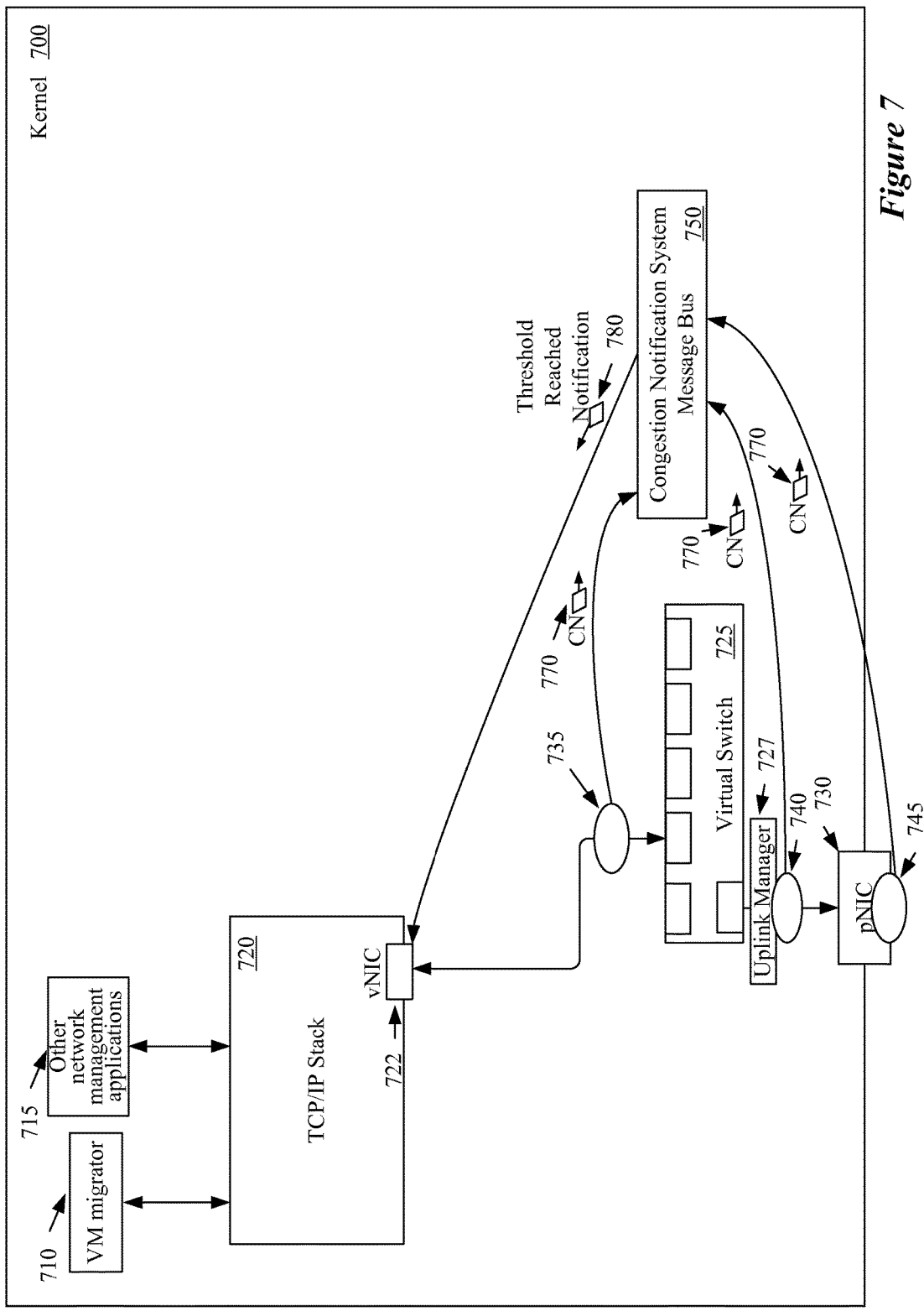
FIG. 7 illustrates a congestion notification system of some embodiments with multiple components that notify higher components about congestion.

The congestion notification system of FIG. 6 includes a single component (the uplink manager 350) that notifies a higher component about congestion, and a single component (the vNIC 343) that receives notifications about congestion. However, other embodiments provide multiple components that notify higher components about congestion and/or multiple components that receive notification about congestion. FIG. 7 illustrates a congestion notification system of some embodiments with multiple components that notify higher components about congestion. The figure includes kernel 700, VM migrator 710, other network management application 715, TCP/IP stack 720 with vNIC 722, virtual switch 725, uplink manager 727, pNIC 730, chokepoints 735, 740, and 745, congestion notification system message bus 750, congestion notification messages 770, and threshold reached notification messages 780.

The VM migrator 710 and other network management application 715 are network management processes running on kernel 700. These and other network management processes (not shown) produce data that is sent as packets through various computer virtualization networking stack processes, such as the TCP/IP stack 720, vNIC 722, virtual switch 725, and uplink manager 727. The data packets are then passed on to the pNIC 730 for transmission to a network (not shown). The computer virtualization networking stack processes of some embodiments include multiple chokepoints. In the embodiment of FIG. 7, there are three chokepoints 735, 740, and 745. Each chokepoint represents a packet queue administered by a component of the computer virtualization networking stack processes. The packet queues are used to store packets until the packets can be sent along to the next component in the stack. For example, chokepoint 740 conceptually illustrates an uplink queue implemented by uplink manager 727. In some embodiments, each component in the computer virtualization networking stack has a queue. In other embodiments, some components have a queue and other components do not.

In the illustrated embodiment, the vNIC 722 is the sole component that receives notification of congestion further down the computer virtualization networking stack. In some embodiments, the component responsible for a queue notifies the vNIC 722 when congestion reaches a threshold level. That is, when the queue is a threshold percentage full. In some embodiments, each queue has an independent threshold setting. For example, in some embodiments a first threshold level could be set for the queue represented by chokepoint 740 (e.g., a threshold at 90%), a second threshold could be set for the queue represented by chokepoint 745 (e.g., a threshold at 70%), etc. In some embodiments, there is a default threshold setting for each chokepoint. In some such embodiments, the default thresholds for the chokepoints can be overridden by configuration of the component managing the queue.

When the queue of a particular component reaches the threshold fullness, the component sends a congestion notification message 770 to the higher layer component (here, vNIC 722) through a congestion notification system message bus 750. The congestion notification message 770 of some embodiments includes more data than the fact that the threshold has been reached. For example, the congestion notification message 770 of some embodiments includes the actual percentage of congestion (e.g., if the threshold level is 70%, but the queue is actually 85% full, the congestion notification message 770 will indicate that the congestion level is 85%).

The congestion notification message 770 of some embodiments includes the source of the packets (e.g., the source IP address and/or MAC address of the packet) that are congesting the queue. In some embodiments, the identified source is the source of the last packet to enter the queue. In some embodiments, the identified source is source of the last packet received before the congestion message is sent (e.g., the top packet in the queue or the last dropped packet). In other embodiments, the identified source is based on a most common source of a sampling of packets (e.g., a fraction or all of the packets) in the queue. In some embodiments, by the congestion notification system identifying the source of the congestion, the higher component can selectively reduce the rate of sending packets only of those slow down packets from the source of the congestion, without reducing the rates of sending packets from other sources. In some embodiments, the congestion notification messages 770 include other data relating to one or more packets in the queue (e.g., the destination, size, a hash of the contents, etc.). In some embodiments, when the packets are TCP packets, the congestion notification messages include TCP flow information (e.g., source address, destination address, source port, and destination port, protocol in use, a hash of the data in the message, etc.).

The congestion notification message 770 is then sent to the higher component (e.g., vNIC 722) as a threshold reached notification message 780. In some embodiments the threshold reached notification message 780 is a copy of the congestion notification message 770. In other embodiments, the threshold reached notification message 780 is a summary or an aggregate of congestion notification messages. In some embodiments, the threshold reached notifications for a particular chokepoint are sent only to components that subscribe to the message bus to receive congestion notifications about that particular chokepoint. In some embodiments a component subscribes by sending a subscription message for a chokepoint to a congestion notification system message bus. In other embodiments, a component is subscribed by its configuration (e.g., the subscription, or non-subscription, for each chokepoint is set in a configuration setting of the subscribing component).

Figure 8:
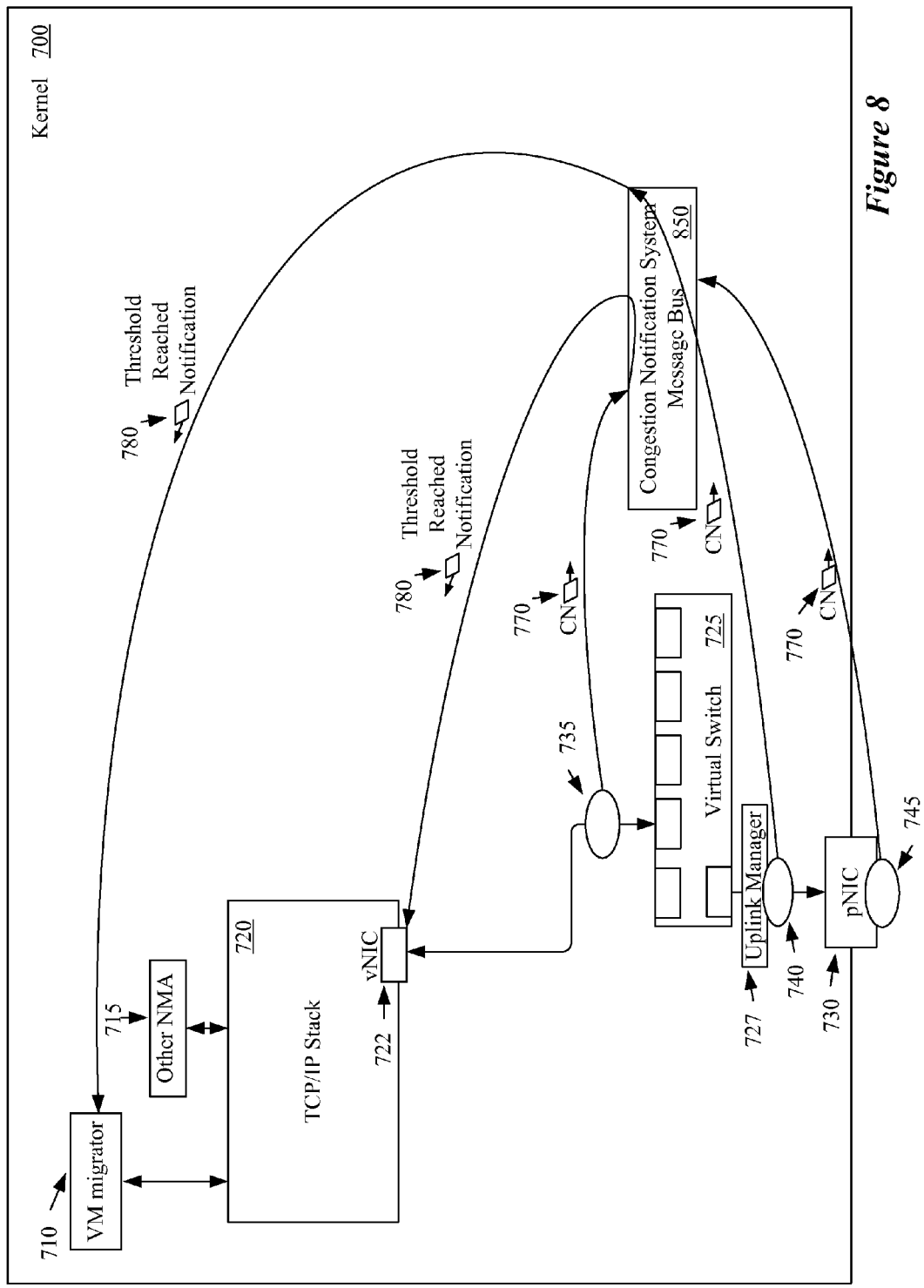
FIG. 8 illustrates a congestion notification system of some embodiments in which multiple components are notified of congestion.

FIG. 8 illustrates a congestion notification system of some embodiments in which multiple components are notified of congestion. The figure includes the same components and processes as FIG. 7, with congestion notification system message bus 750 replaced with congestion notification system message bus 850. The congestion notification system message bus 850 of this embodiment sends threshold reached notifications to multiple higher components. In FIG. 8, both the vNIC 722 and the VM migrator 710 receive notifications of congestion.

This figure also illustrates that in some embodiments that provide congestion notification options, not all chokepoints have to be monitored. Furthermore, different chokepoints can be monitored to send congestion notifications to different higher components. Here, VM migrator 710 is subscribed to receive congestion notifications about chokepoint 740 (e.g., from the uplink manager 727 through the message bus 850). Because the VM migrator 710 is not subscribed to receive notification about any other chokepoints, the only threshold reached notification messages 780 that the VM migrator 710 will receive identify congestion at the queue of the uplink manager 727 (i.e., chokepoint 740). The vNIC 722 is subscribed to receive congestion notifications about chokepoint 735. Because the vNIC 722 is not subscribed to receive notification about any other chokepoint, the only threshold reached notification messages 780 that the vNIC 722 will receive identify congestion at a queue of the virtual switch 725.

In addition to the chokepoints monitored for congestion in this figure, the pNIC 730 sends congestion notification messages 770 when its queue (represented by chokepoint 745) is above its threshold value. However, the congestion notification messages are not sent from the congestion notification system message bus 850 to any higher layer components because no higher layer components are subscribed to monitor congestion of the chokepoint 745. In some such embodiments, the congestion notification system message bus then discards the congestion messages from that chokepoint. In alternate embodiments, the component managing the queue of the chokepoint does not send congestion messages to a congestion notification system message bus when no higher layer component is monitoring the congestion at that chokepoint. In some embodiments, the congestion notification message includes an indicator of which higher component should receive the congestion notification message.

In some embodiments, each queue has multiple independent threshold settings (e.g., one for each higher component receiving congestion notifications). In the embodiment of FIG. 8, the VM migrator 710 and vNIC 722 subscribe to receive configuration notification messages about separate queues. However, in some embodiments each queue can be independently monitored by each higher component. For example, the VM migrator 710 could subscribe to be notified when the uplink queue represented by chokepoint 740 is above its threshold while the vNIC 722 could also subscribe to be notified when the uplink queue represented by chokepoint 740 is above its threshold.

As described with respect to FIG. 7, when the queue of a particular component reaches the threshold fullness, the component sends a congestion notification message 770 to the higher layer component (here, vNIC 722 and VM migrator 710) through a congestion notification system message bus 850. The congestion notification message 770 of some embodiments includes more data than the fact that the threshold has been reached. For example, the congestion notification message 770 of some embodiments includes the actual percentage of congestion (e.g., if the threshold level is 70%, but the queue is actually 85% full, the congestion notification message 770 will indicate that the congestion level is 85%). The congestion notification message 770 of some embodiments includes the source of the packets (e.g., the source IP address and/or MAC address of the packet) that are congesting the queue. In some embodiments, the identified source is the last packet to enter the queue. In other embodiments, the identified source is based on a most common source of a sampling of packets (e.g., a fraction or all of the packets) in the queue. In some embodiments, by the congestion notification system identifying the source of the congestion, the higher component can selectively reduce the rate of sending packets only of those slow down packets from the source of the congestion, without reducing the rates of sending packets from other sources. In some embodiments, the congestion notification messages 770 include other data relating to one or more packets in the queue (e.g., the destination, size, a hash of the contents, etc.).

Figure 9:
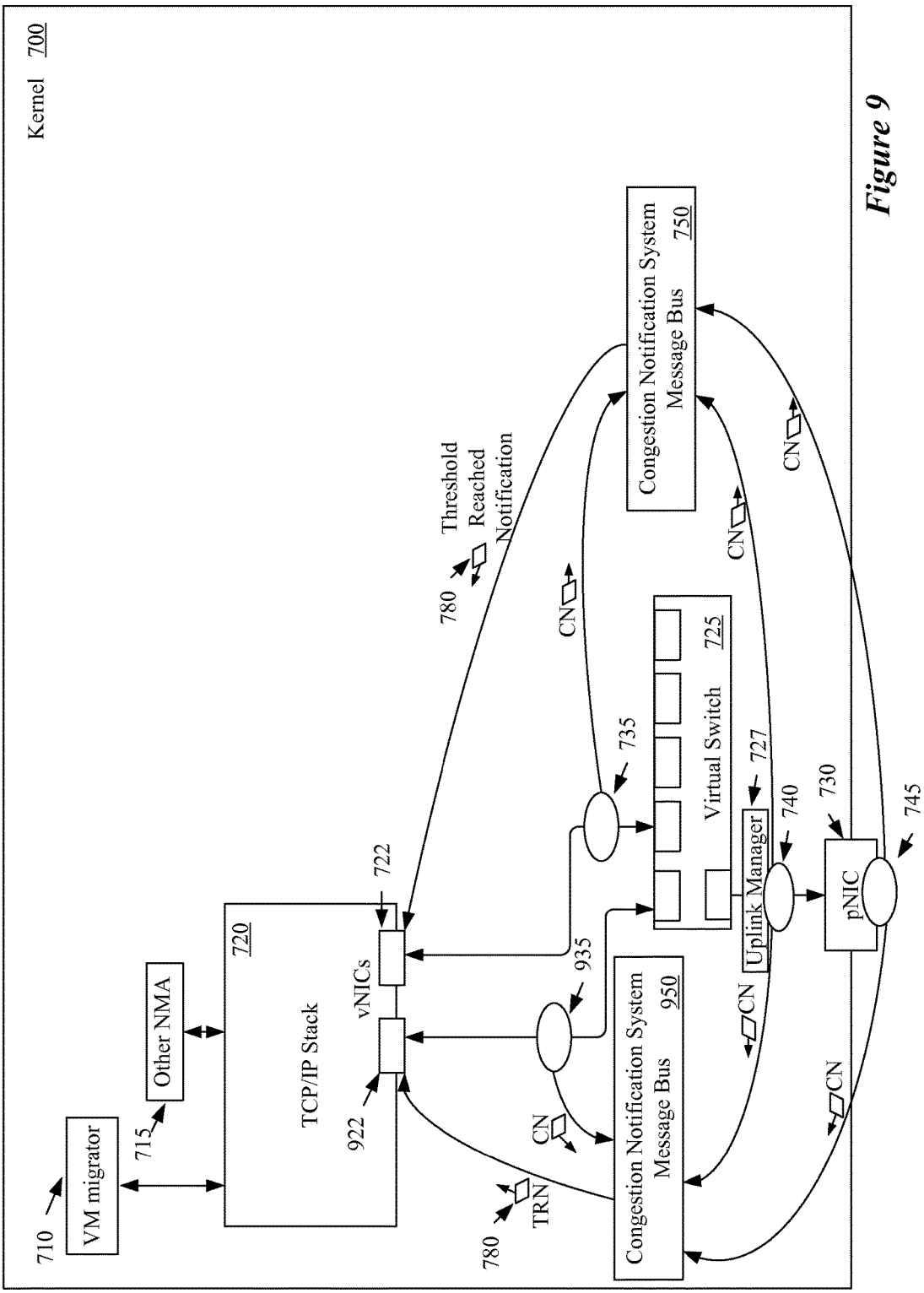
FIG. 9 illustrates a congestion notification system of some embodiments in which multiple vNICs are notified of congestion through multiple congestion notification system message buses.

Some embodiments provide a separate congestion notification system message bus for each higher component to be notified of congestion. For example, some embodiments provide a separate congestion notification system message bus for each of multiple vNICs on a TCP/IP stack of a kernel. FIG. 9 illustrates a congestion notification system of some embodiments in which multiple vNICs are notified of congestion through multiple congestion notification system message buses. The figure includes the same components and processes as FIG. 7, with the addition of a second vNIC 922, chokepoint 935, and congestion notification system message bus 950. The congestion notification system message bus 950 of this embodiment sends threshold reached notifications 780 to the second vNIC 922. In FIG. 9, both the vNICs 722 and 922 receive notifications of congestion.

In this figure, vNIC 922 is subscribed to receive congestion notifications about chokepoints 935 (actually to the virtual switch that manages the queue represented by chokepoint 935), 740, and 745. Accordingly, the vNIC 922 receives threshold reached notification messages 780 to identify congestion at the queues of the uplink manager 727, the pNIC 730, and the port of the virtual switch 725 represented by chokepoint 935. The threshold reached notification messages 780 for vNIC 922 are sent from congestion notification system message bus 950.

The vNIC 722 is subscribed to receive congestion notifications about chokepoints 735 (actually to the process, e.g., the virtual switch that manages the queue represented by chokepoint 735), 740, and 745. Accordingly, the vNIC 722 receives threshold reached notification messages 780 to identify congestion at the queues of the uplink manager 727, the pNIC 730, and the port of the virtual switch 725 represented by chokepoint 735. The threshold reached notification messages 780 for vNIC 722 are sent from congestion notification system message bus 750.

As described with respect to FIG. 7, when the queue of a particular component reaches the threshold fullness, the component sends a congestion notification message 770 to the higher layer component (here, vNICs 722 through a congestion notification system message bus 750 and the vNIC 922 through a congestion notification system message bus 950). The congestion notification message 770 of some embodiments includes more data than the fact that the threshold has been reached. For example, the congestion notification message 770 of some embodiments includes the actual percentage of congestion (e.g., if the threshold level is 70%, but the queue is actually 85% full, the congestion notification message 770 will indicate that the congestion level is 85%). The congestion notification message 770 of some embodiments includes the source of the packets (e.g., the source IP address and/or MAC address of the packet) that are congesting the queue. In some embodiments, the identified source is the last packet to enter the queue. In other embodiments, the identified source is based on a most common source of a sampling of packets (e.g., a fraction or all of the packets) in the queue. In some embodiments, by the congestion notification system identifying the source of the congestion, the higher component can selectively reduce the rate of sending packets only of those slow down packets from the source of the congestion, without reducing the rates of sending packets from other sources. In some embodiments, the congestion notification messages 770 include other data relating to one or more packets in the queue (e.g., the destination, size, a hash of the contents, etc.).

V. Congestion Notification System Processes

In some embodiments, various processes are implemented by components of the computer virtualization networking stack in order to set thresholds at which lower layer components should provide congestion notification messages and in order to properly respond to congestion by notifying higher layer components. In some embodiments, a particular component both receives congestion notifications from (relatively) lower layer components and sends congestion notifications to (relatively) higher layer components.

Figure 10:
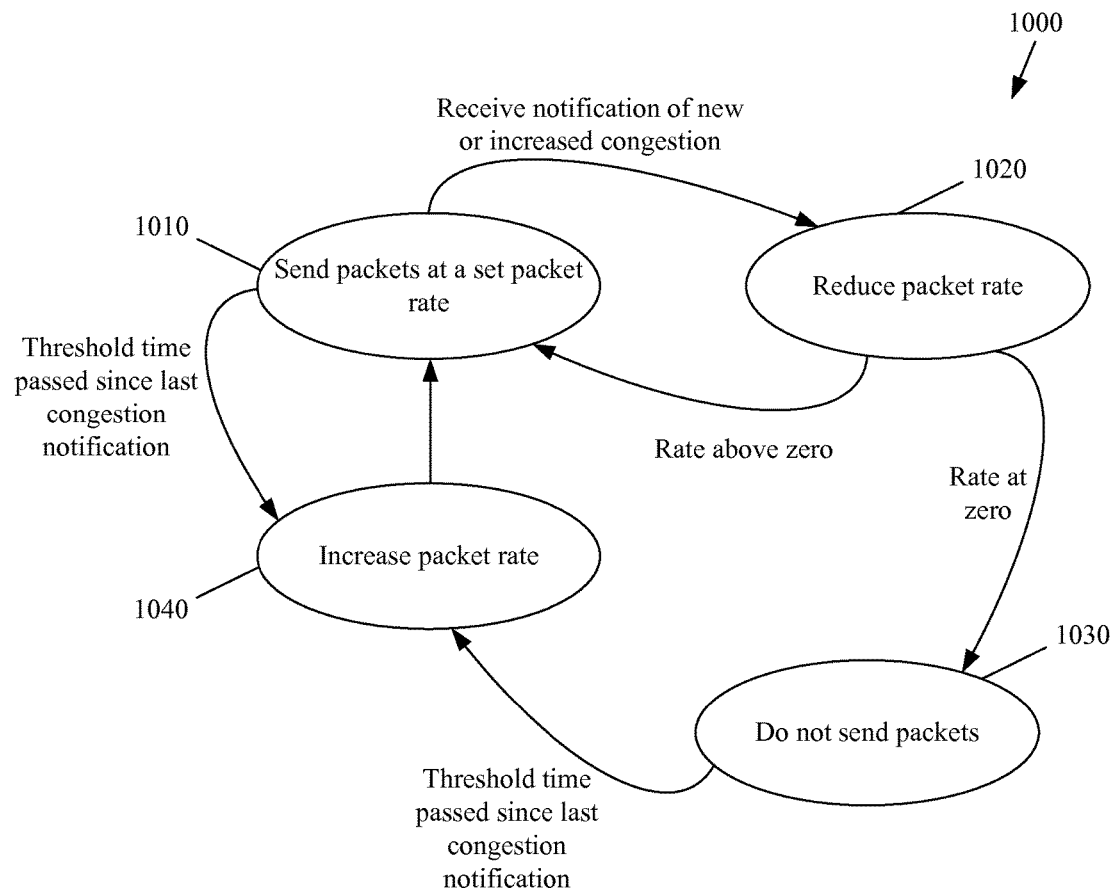
FIG. 10 conceptually illustrates a state diagram for a higher layer component receiving congestion notification messages from lower layer components.

FIG. 10 conceptually illustrates a state diagram 1000 for a higher layer component receiving congestion notification messages from lower layer components. In some embodiments, the higher layer component starts in state 1010. In state 1010, the component sends data packets at a set rate (in some embodiments, the rate may be set to "as fast as possible" or to a particular sending rate) to the lower layers of a computer virtualization networking stack toward a network. For example, in FIG. 5, vNIC 343 sends data packets 512 toward the network through the virtual switch. In some embodiments, the higher layer component initially sends these data packets to the lower layers as fast as it can, pending later receipt of a congestion notification.

In order to receive congestion notifications from a lower network layer, the higher layer component subscribes to receive congestion notifications about a lower layer, queue managing, component. A threshold congestion setting of the chokepoint (e.g., a default setting or a setting set in the configuration of the component managing the queue) determines what level of congestion (i.e., fullness of the queue managed by the queue managing component) will result in a congestion notification message being sent to the congestion notification system message bus.

The higher layer component continues to send packets at the set rate until it receives a notification of new or increased congestion (e.g., a threshold reached notification message or a congestion notification message from a lower layer component, either directly or through a message bus). When the higher layer component receives such a notification, the state transitions to state 1020, which reduces the packet rate (assuming the packet rate is not already sufficiently low as a result of previous congestion notification messages). If the rate is above zero, the higher layer component then transitions back to state 1010 and continues to send packets at the new, reduced, rate. In some embodiments, the reduced packet rate could be zero, in which case the higher layer component transitions to state 1030 and stops sending packets until a threshold time has passed since the last congestion notification.

When a threshold time has passed since the last received congestion notification, the higher layer component transitions from state 1010 (or 1030) to state 1040. In state 1040, the higher layer component increases the packet sending rate and returns to state 1010.

In some embodiments, the packet rate is lowered by a particular amount each time a congestion notification is received. In some embodiments, the rate of sending packets from the higher layer is lowered to zero when the congestion notification is received and the packets are stored in a queue of the higher layer component (see, e.g., FIG. 6). In other embodiments, the higher layer component rejects requests from even higher layer components to generate data packets (e.g., a vNIC or TCP/IP stack will slow down generation or not generate packets for a VM migrator while there is congestion in the lower layer components). In some embodiments, the packet sending rate is lowered by an amount based on the level of congestion. For example, the packet sending rate could be half of a maximum rate when the congestion in a queue is 70% full, a quarter of maximum rate when the congestion in the queue is 85% full, and zero when the congestion in the queue is 100% full.

Figure 11:
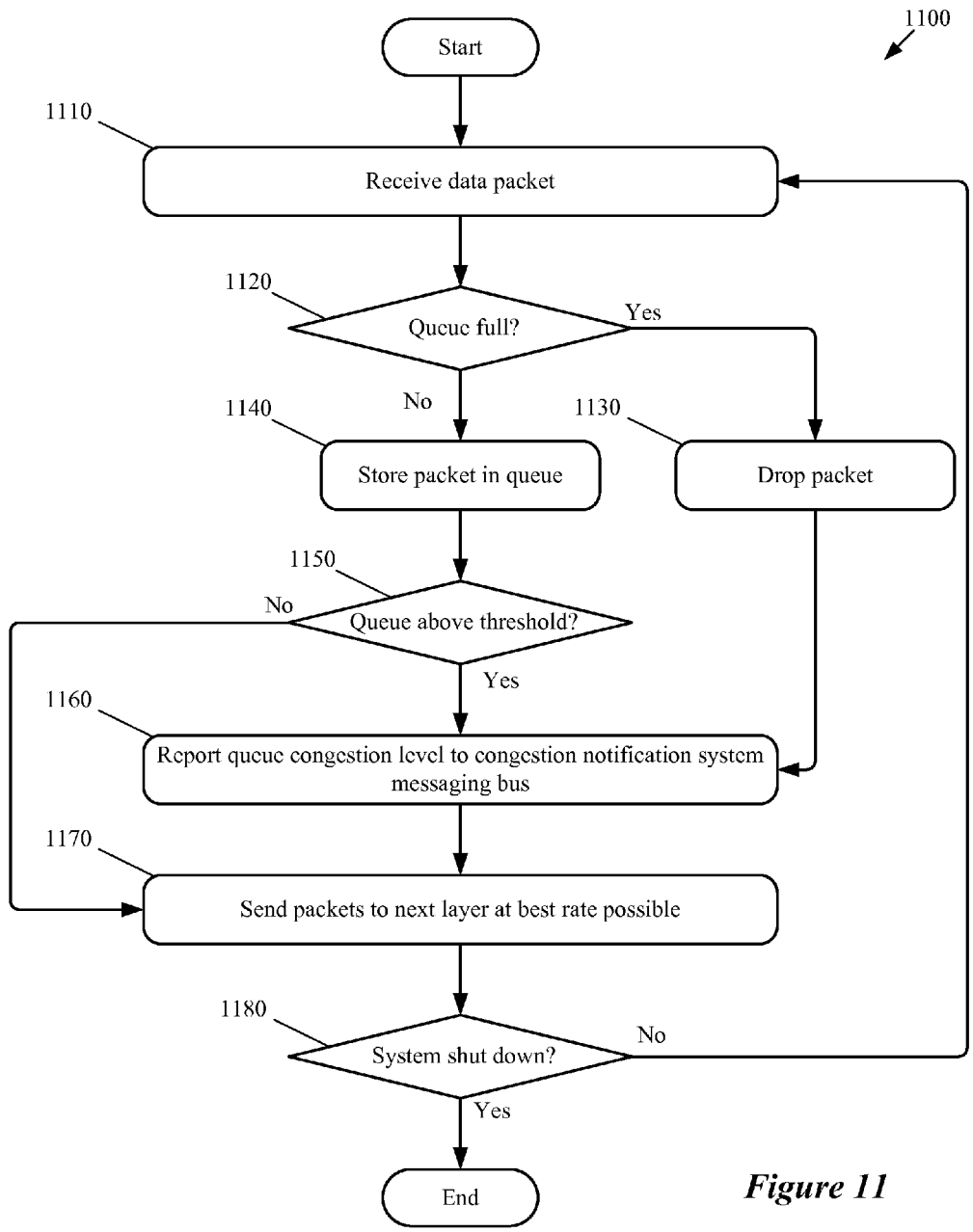
FIG. 11 conceptually illustrates a process of some embodiments for a lower layer component to report congestion to a higher layer component.

FIG. 11 conceptually illustrates a process 1100 of some embodiments for a lower layer component to report congestion to a higher layer component. The process 1100 receives (at 1110) a data packet. For example, in FIG. 5, the uplink manager 350 receives data packets 514 from virtual switch 344. The process 1100 then determines (at 1120) whether the queue of the lower layer component is full. When the queue is full, the process 1100 drops (at 1130) the newly arrived packets and proceeds to operation 1160. When the queue is not full, the process 1100 stores (at 1140) the packets in the queue. For example, in FIG. 5, the uplink manager 350 stores the data packets 514 in the uplink queue. In some embodiments, multiple packets arrive in a short amount of time when a queue is almost full. In such a situation, it is possible for the packets to "overflow" the queue. In some embodiments, when a queue overflows, some of the arriving packets are stored in the space left in the queue and the rest of the arriving packets are dropped.

After operation 1140, the process 1100 determines (at 1150) whether the queue is above the threshold congestion setting for sending congestion notification messages. When the queue is not above the threshold, the process 1100 proceeds to operation 1170 to send out packets. When the queue is above the threshold, the process reports the queue congestion level (i.e., how full the queue is) to the higher layer component through a congestion notification system message bus. The process 1100 then sends (at 1170) packets to the next lower layer at the best possible rate. In some embodiments, the best possible rate is the highest rate at which the next lower component will accept packets. In other embodiments, the best possible rate is lowered in response to congestion notification messages from even lower layers (e.g., in some embodiments, a pNIC sends congestion notification messages to an uplink manager, either instead of, or in addition, to the uplink manager sending congestion notification messages to a vNIC). In some embodiments, the best possible rate under some circumstances (e.g., when there is congestion below, or when the next component not accepting packets) may be zero, in which case the process 1100 does not send out packets in operation 1170.

The process 1100 then determines (at 1180) whether the system has been shut down (e.g., after receiving a shutdown command). When the system has not been shut down, the process 1100 returns to operation 1110 to receive the next packet. When the system has been shut down, the process 1100 ends.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
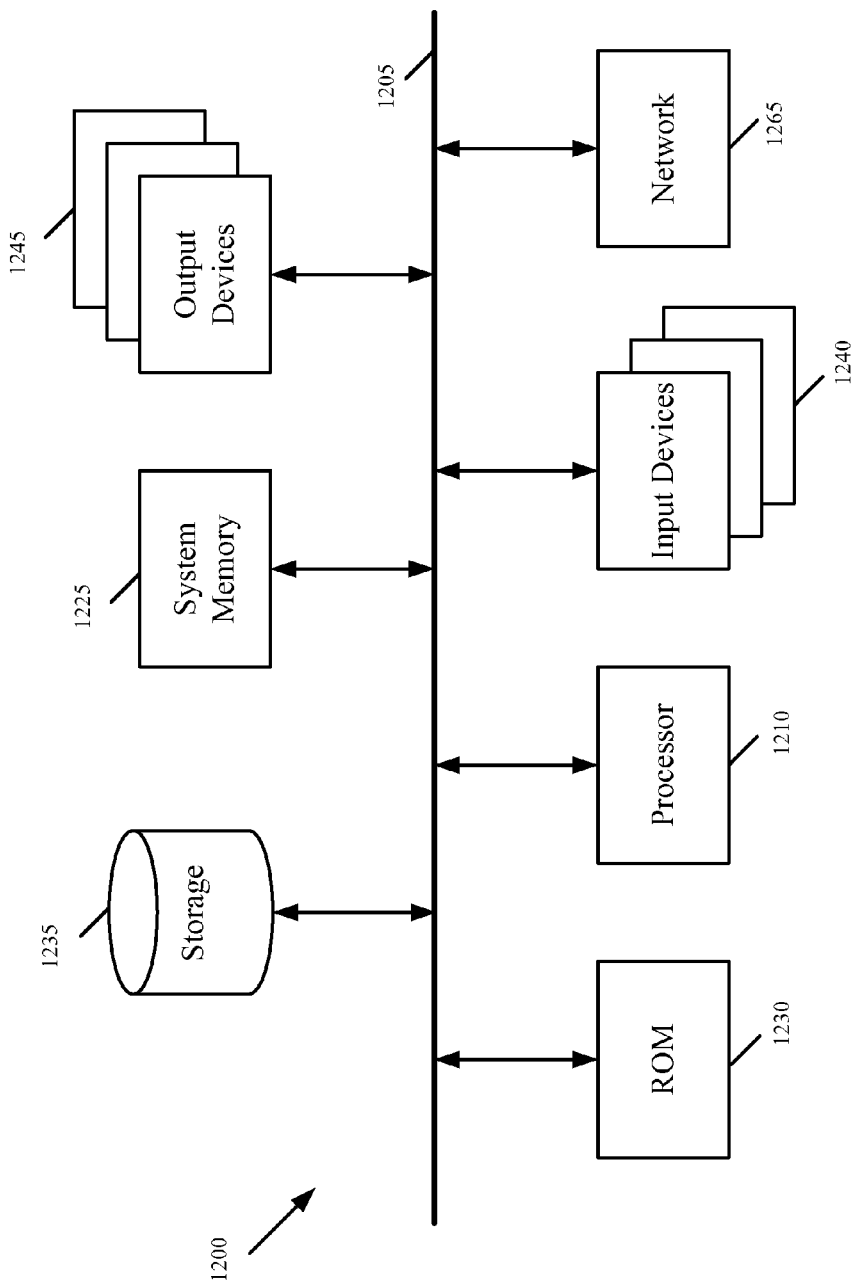
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, host machine, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "host", "machine", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, FIG. 11 conceptually illustrates a process. The specific operations of the process may not be performed in the exact order shown and described. The specific operations may not be performed in one continuous series of operations, and different specific operations may be performed in different embodiments. Furthermore, the process could be implemented using several sub-processes, or as part of larger macro processes.

What is claimed is:

1. A method of reducing congestion in a network stack of a host machine having a virtual switch with a plurality of downlink ports each connected to a virtual network interface (VNIC) and at least one uplink port connected to a physical network interface (PNIC), the network stack comprising a series of components that send data packets through the network stack to a network, the method comprising:

receiving, by a lower-level component of the network stack, data packets at an initial rate, the lower-level component of the network stack having a packet queue that temporarily stores data packets to be sent to the network;

determining, by the lower-level component, that the packet queue has filled up to a threshold level;

in response to the determining that the packet queue has filled up to the threshold level, sending a congestion notification message from the lower-level component of the network stack to a message bus managed by the host machine, the congestion notification message indicating that the queue has reached the threshold level, the message bus being subscribed to by higher-level components of the network stack for receiving the congestion notification message, the lower-level component being closer to the network than the higher-level components;

as a result of the congestion message indicating that the queue has reached the threshold level, causing a reduction in the initial rate of sending data packets to the lower-level component of the network stack; and receiving, by the lower-level component, data packets at the reduced initial rate.

2. The method of claim 1, wherein the higher-level components include at least one VNIC.

3. The method of claim 1, wherein the congestion notification message is sent by the lower-level component based on a threshold congestion configuration setting of the lower-level component.

4. The method of claim 1, wherein the congestion notification message includes a source address of a packet arriving at the lower-level component before the congestion notification message is sent.

5. The method of claim 4, wherein the source address includes one of an IP address and a MAC address.

6. The method of claim 4, wherein the packet is a most recent packet to arrive at the lower-level component.

7. The method of claim 1, wherein the congestion notification message includes a most common source address of a plurality of packets arriving at the lower-level component before the congestion notification message is sent.

8. The method of claim 1, wherein the congestion notification message is a first congestion notification message, wherein a second lower-level component having a corresponding packet queue of the network stack sends a second congestion message to the message bus in response to the corresponding packet queue being at or above a threshold portion of its capacity.

9. A system comprising:
a host machine comprising:
a physical network interface (PNIC);
a virtual switch with a plurality of downlink ports connected to a virtual network interface (VNIC) and at least one uplink port connected to the PNIC; and
a network stack comprising a series of components that send data packets through the network stack to a network, a lower-level component of the network stack configured to:
receive data packets at an initial rate, the lower-level component of the network stack having a packet queue that temporarily stores data packets to be sent to the network;
determining that the packet queue has filled up to a threshold level;
in response to the determining that the packet queue has filled up to the threshold level, sending a congestion notification message to a message bus managed by the host machine, the congestion notification message indicating that the queue has reached the threshold level, the message bus being subscribed to by higher-level components of the network stack for receiving the congestion notification message, the lower level component being closer to the network than the higher-level components; and
as a result of the congestion message indicating that the queue has reached the threshold level, receiving data packets at a rate that is reduced from the initial rate.

10. The system of claim 9, wherein the higher-level components include at least one VNIC.

11. The system of claim 9, wherein the congestion notification message is sent by the lower-level component based on a threshold congestion configuration setting of the lower-level component.

12. The system of claim 9, wherein the congestion notification message includes a source address of a packet arriving at the lower-level component before the congestion notification message is sent.

13. The system of claim 12, wherein the source address includes one of an IP address and a MAC address.

14. The system of claim 12, wherein the packet is a most recent packet to arrive at the lower-level component.

15. The system of claim 9, wherein the congestion notification message includes a most common source address of a plurality of packets arriving at the lower-level component before the congestion notification message is sent.

16. The system of claim 9, wherein the congestion notification message is a first congestion notification message, wherein a second lower-level component having a corresponding packet queue of the network stack sends a second congestion message to the message bus in response to the corresponding packet queue being at or above a threshold portion of its capacity.

17. A non-transitory machine readable medium storing a program that when executed by at least one processor implements a component of a network stack of a host machine having a virtual switch with a plurality of downlink ports each connected to a virtual network interface (VNIC) and at least one uplink port connected to a physical network interface (PNIC), the network stack comprising a plurality of components that transmit data packets from a data packet sender to a network, the program comprising sets of instructions for:
receiving, by a lower-level component of the network stack, data packets at an initial rate, the lower-level component of the network stack having a packet queue that temporarily stores data packets to be sent to the network;
determining, by the lower-level component, that the packet queue has filled up to a threshold level;
in response to the determining that the packet queue has filled up to the threshold level, sending a congestion notification message from the lower-level component of the network stack to a message bus managed by the host machine, the congestion notification message indicating that the queue has reached the threshold level, the message bus being subscribed to by higher-level components of the network stack for receiving the congestion notification message, the lower-level component being closer to the network than the higher-level components;
as a result of the congestion message indicating that the queue has reached the threshold level, causing a reduction in the initial rate of sending data packets to the lower-level component of the network stack; and
receiving, by the lower-level component, data packets at the reduced initial rate.

18. The non-transitory machine readable medium of claim 17, wherein the higher-level components include at least one VNIC.

19. The non-transitory machine readable medium of claim 18, wherein the congestion notification message is sent by the lower-level component based on a threshold congestion configuration setting of the lower-level component.

20. The non-transitory machine readable medium of claim 18, wherein the congestion notification message includes a source address of a packet arriving at the lower-level component before the congestion notification message is sent.

* * * * *